(12) United States Patent
Endo (10) Patent No.: US 10,844,771 B2
(45) Date of Patent: Nov. 24, 2020

(54) COOLING APPARATUS OF ENGINE

(71) Applicant: TOYOTA JIDOSHA KABUSHIKI KAISHA, Toyota (JP)

(72) Inventor: Yoshiki Endo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/260,749

(22) Filed: Jan. 29, 2019

(65) Prior Publication Data

US 2019/0292977 A1 Sep. 26, 2019

(30) Foreign Application Priority Data

Mar. 20, 2018 (JP) .................. 2018-052535

(51) Int. Cl.
| | |
|---|---|
| *F01P 3/00* | (2006.01) |
| *F01P 7/16* | (2006.01) |
| *B60K 11/04* | (2006.01) |
| *F01P 3/18* | (2006.01) |
| *F01P 5/12* | (2006.01) |
| *F01P 3/20* | (2006.01) |

(52) U.S. Cl.
CPC .............. *F01P 7/165* (2013.01); *B60K 11/04* (2013.01); *F01P 3/18* (2013.01); *F01P 5/12* (2013.01); *F01P 3/20* (2013.01); *F01P 2050/22* (2013.01)

(58) Field of Classification Search
CPC .... F01P 7/16; F01P 7/165; F28F 27/02; F28F 2250/06
USPC ...................................... 123/41.29
See application file for complete search history.

(56) References Cited

U.S. PATENT DOCUMENTS

| | | | | |
|---|---|---|---|---|
| 4,964,371 A | * | 10/1990 | Maeda ..................... | F01P 7/167 123/41.1 |
| 6,530,347 B2 | * | 3/2003 | Takahashi ............... | F01P 7/048 123/41.1 |
| 7,073,467 B2 | * | 7/2006 | Kanno ..................... | F01P 7/165 123/41.33 |
| 7,735,461 B2 | * | 6/2010 | Vetrovec ............... | F28D 20/021 123/41.14 |

(Continued)

FOREIGN PATENT DOCUMENTS

| | | |
|---|---|---|
| JP | H10-227372 A | 8/1998 |
| JP | 2008-223725 A | 9/2008 |

(Continued)

*Primary Examiner* — Long T Tran
*Assistant Examiner* — James J Kim
(74) *Attorney, Agent, or Firm* — Oliff PLC (57) ABSTRACT

A cooling apparatus includes: a radiator promoting heat radiation of cooling water of an engine; a first flow path circulating the cooling water discharged from the engine through the radiator to the engine; a second flow path circulating the cooling water discharged from the engine to the engine without through the radiator; a thermostat attached in a junction of the first and second flow paths, closing the first flow path when a temperature of the cooling water in the second flow path is lower than a threshold value, and opening the first flow path when the temperature of the cooling water in the second flow path is equal to or higher than the threshold value; and a third flow path communicating a part, of the first flow path between the engine and the radiator, with a part, of the first flow path between the radiator and the thermostat.

3 Claims, 5 Drawing Sheets

(56) References Cited

U.S. PATENT DOCUMENTS

| | | | | |
|---|---|---|---|---|
| 8,485,226 | B2 * | 7/2013 | Na | F16K 11/085 |
| | | | | 137/625.47 |
| 9,739,507 | B2 * | 8/2017 | Wehner | G05D 23/1346 |
| 10,132,403 | B1 * | 11/2018 | Gooden | F16H 57/0475 |
| 2002/0023596 | A1 * | 2/2002 | Hirano | F01P 7/16 |
| | | | | 123/41.1 |
| 2011/0259287 | A1 * | 10/2011 | Kakehashi | F01P 7/164 |
| | | | | 123/41.09 |
| 2013/0157532 | A1 * | 6/2013 | Takano | B63H 20/001 |
| | | | | 440/880 |
| 2013/0160723 | A1 * | 6/2013 | Miyagawa | F01P 7/16 |
| | | | | 123/41.1 |
| 2013/0213322 | A1 * | 8/2013 | Takeuchi | F01P 3/02 |
| | | | | 123/41.1 |
| 2014/0023107 | A1 * | 1/2014 | Furuta | F01P 11/16 |
| | | | | 374/4 |
| 2016/0281586 | A1 * | 9/2016 | Hosokawa | F01P 11/16 |
| 2017/0030274 | A1 * | 2/2017 | Nakanishi | F01P 11/16 |
| 2017/0321597 | A1 | 11/2017 | Michikawauchi | |

FOREIGN PATENT DOCUMENTS

| | | |
|---|---|---|
| JP | 2016-102456 A | 6/2016 |
| JP | 2017-160821 A | 9/2017 |
| JP | 2018-105185 A | 7/2018 |

* cited by examiner

COOLING APPARATUS OF ENGINE

CROSS-REFERENCE TO RELATED APPLICATION

This application is based upon and claims the benefit of priority of the prior Japanese Patent Application No. 2018-052535, filed on Mar. 20, 2018, the entire contents of which are incorporated herein by reference.

TECHNICAL FIELD

The present disclosure relates to a cooling apparatus of an engine.

BACKGROUND

Conventionally, there is known a cooling apparatus of an engine. The cooling apparatus is provided with: a radiator promoting heat radiation of cooling water discharged from the engine; a first flow path circulating the cooling water to the engine through the radiator; a second flow path circulating the cooling water to the engine without through the radiator; and a thermostat provided in a junction of the first and second flow paths.

The thermostat closes the first flow path, when the temperature of the cooling water in the second flow path is lower than a threshold value. Thus, when the low-temperature cooling water is discharged from the engine, the circulation of the cooling water to the engine through the radiator is restricted, which promotes the warming up of the engine. Further, the thermostat opens the first flow path, when the temperature of the cooling water in the second flow path is equal to or higher than the threshold value. Thus, when the high-temperature cooling water is discharged from the engine, a part of the cooling water is circulated through the radiator to the engine, which promotes heat dispassion of the cooling water, thereby promoting cooling of the engine (for example, Japanese Unexamined Patent Application Publication No. 2016-102456).

In an opening state of the thermostat, the cooling water flows into the thermostat from both the first and second flow paths. The cooling water flowing into the thermostat from the second flow path has already received heat from the engine, so that the temperature of such cooling water is high. In contrast, heat radiation of the cooling water flowing into the thermostat from the first flow path has been already promoted by the radiator, so that the temperature of such cooling water is low. The cooling water having such a difference in temperature joins in the thermostat. If the cooling water having such a difference in temperature is not sufficiently mixed in the thermostat as described above, the temperature of the cooling water in the thermostat becomes non-uniform. As a result, the thermostat might repeatedly open and close in a short period of time, that is, so-called hunting might occur.

It is therefore an object of the present disclosure to provide a cooling apparatus of an engine that suppresses occurrence of hunting of a thermostat.

SUMMARY

It is an object of the present disclosure to provide a cooling apparatus of an engine, including: a radiator promoting heat radiation of cooling water of the engine; a first flow path circulating the cooling water discharged from the engine through the radiator to the engine; a second flow path circulating the cooling water discharged from the engine to the engine without through the radiator; a thermostat attached in a junction of the first and second flow paths, closing the first flow path when a temperature of the cooling water in the second flow path is lower than a threshold value, and opening the first flow path when the temperature of the cooling water in the second flow path is equal to or higher than the threshold value; and a third flow path communicating a part, of the first flow path between the engine and the radiator, with a part, of the first flow path between the radiator and the thermostat.

In a state in which the thermostat opens the first flow path, a part of the cooling water flowing through the first flow path flows into the thermostat through the radiator, but the other of the cooling water flowing through the first flow path flows through the third flow path, bypasses the radiator, and flows through the first flow path into the thermostat again. Therefore, a part of the cooling water flowing into the thermostat from the first flow path flows through the radiator, but the other of the cooling water does not flow through the radiator. This suppresses an excessive decrease in the temperature of the cooling water flowing into the thermostat from the first flow path. This also suppresses a temperature difference between the low-temperature cooling water flowing into the thermostat from the first flow path and the high-temperature cooling water flowing into the thermostat from the second flow path, which suppresses temperature non-uniformity of the cooling water in the thermostat. It is therefore possible to suppress occurrence of the hunting of the thermostat.

A flow path cross-sectional area of the third flow path may be smaller than that of the first flow path.

The radiator may include an introduction tank, a discharge tank, and a radiator core positioned between the introduction tank and the discharge tank and communicating the introduction tank with the discharge tank, the first flow path may be communicated with the introduction tank, and the third flow path may be communicated with the part of the first flow path positioned between the radiator and the thermostat through the discharge tank.

The cooling apparatus may include a pouring portion provided between the engine and the radiator and in a portion where the first and third flow paths communicate with each other, and capable of supplying the cooling water to the first and third flow paths, wherein the pouring portion may be arranged above the engine and the radiator in a gravity direction.

DETAILED DESCRIPTION

Figure 1A:
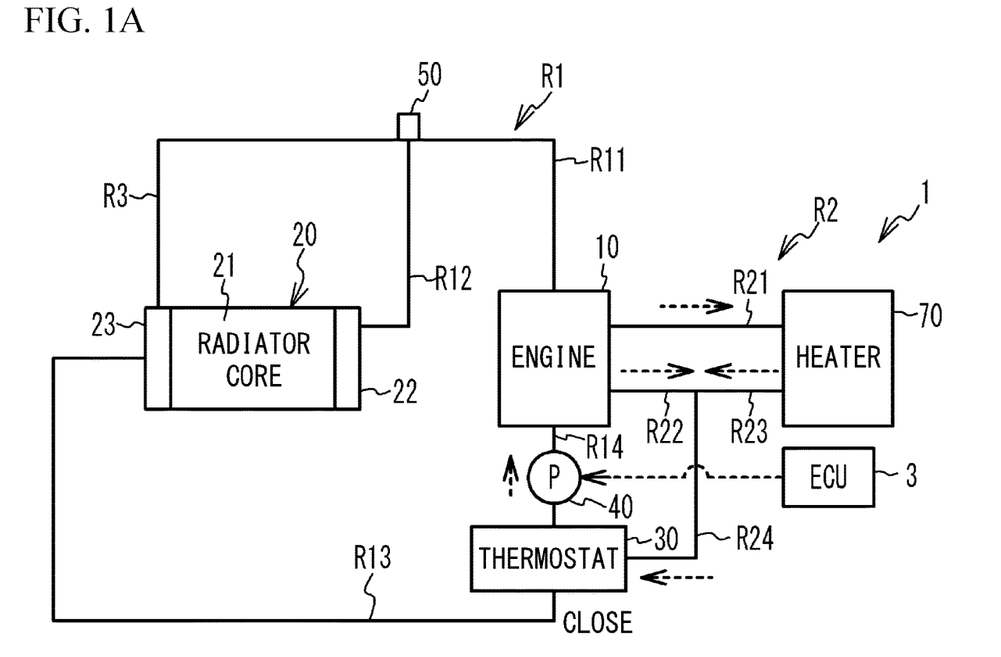
FIGS. 1A and 1B are schematic views of a cooling apparatus of an engine.
Figure 1B:
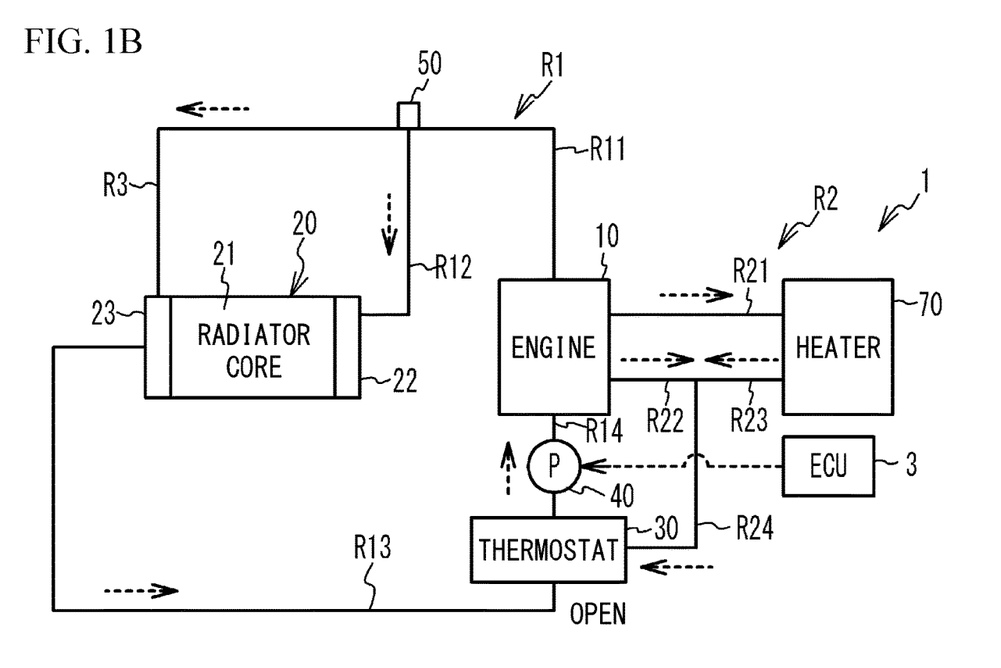

FIGS. 1A and 1B are schematic views of a cooling apparatus 1 of an engine 10 (hereinafter referred to as a cooling apparatus) according to the present embodiment. In the present embodiment, the cooling apparatus 1 and the engine 10, but not limited to, are mounted on a vehicle. The cooling apparatus 1 includes an Electronic Control Unit (ECU) 3, a radiator 20, a thermostat 30, a water pump 40, a pouring portion 50, and a heater 70. The cooling apparatus 1 is provided with flow paths R1 and R2 through which cooling water circulates, and with a flow path R3 communicated with the flow path R1. The driving of the water pump 40 causes the cooling water to circulate at least through the flow path R2, whereas the flow of the cooling water in the flow paths R1 and R3 changes in response to an opening or closing state of the thermostat 30. FIG. 1A illustrates dashed arrows indicating the flow of the cooling water in the closing state of the thermostat 30. FIG. 1B illustrates dashed arrows indicating the flow of the cooling water in the opening state of the thermostat 30. The thermostat 30 will be described later in detail. The water pump 40 is, but not limited to, an electric type driven by supply of electric power and controlled by the ECU 3, and may be a mechanical type driven by receiving the driving force of the engine 10. The cooling water is, for example, Long Life Coolant (LLC).

The flow path R2 will be described. The flow path R2 is an example of a second flow path circulating the cooling water discharged from the engine 10 to the engine 10 without through the radiator 20. The flow path R2 includes flow paths R21, R22, R23, and R24. The flow path R21 communicates a water jacket formed in an cylinder head of the engine 10 with the heater 70. The flow path R22 communicates a water jacket formed in a cylinder block of the engine 10 with the flow path R23. In addition, the water jacket formed in the cylinder head of the engine 10 is communicated with the water jacket formed in the cylinder block. The flow path R23 communicates the heater 70 with the flow path R22. The flow path R24 communicates a junction of the flow paths R22 and R23 with the thermostat 30. The cooling water flows through the flow path R2, regardless of the opening or closing state of the thermostat 30. Specifically, as illustrated in FIGS. 1A and 1B, the cooling water discharged from the cylinder head of the engine 10 flows through the flow path R21 to the heater 70, and then is discharged from the heater 70 to the flow path R23. Further, the cooling water discharged from the water jacket in the cylinder block of the engine 10 flows through the flow path R22. Therefore, both the cooling water discharged from the engine 10 through the heater 70, and the cooling water that discharged from the engine 10 without through the heater 70, flow through the flow path R24. The cooling water flowing through the flow path R24 flows into the thermostat 30, and then flows again into the water jacket in the cylinder block of the engine 10 through the flow path R14 described later and included in the flow path R1. In this manner, the cooling water circulating through the flow path R2 and flowing into the thermostat 30 is discharged from the engine 10 without flowing through the radiator 20. Additionally, the flow path R14 of the flow path R1 serves as a part of the flow path R2.

The flow path R1 will be described. The flow path R1 is an example of a first flow path circulating the cooling water discharged from the engine 10 to the engine 10 through the radiator 20. The flow path R1 includes flow paths R11, R12, R13, and R14. The flow path R11 communicates the water jacket formed in the cylinder head of the engine 10 with the flow path R12. The flow path R12 communicates the flow path R11 with an introduction tank 22 of the radiator 20 described later. The flow path R3 described later is communicated with the junction of the flow paths R11 and R12, and the pouring portion 50 described later is provided in the junction. The flow path R13 communicates a discharge tank 23 of the radiator 20 with the thermostat 30. The flow path R14 communicates the thermostat 30 with the cylinder block of the engine 10. The water pump 40 is provided on the flow path R14.

Next, the radiator 20 will be described. The radiator 20 is a so-called side flow type radiator, and includes the introduction tank 22, the discharge tank 23, and a radiator core 21 communicating the introduction tank 22 with the discharge tank 23. Each of the introduction tank 22 and the discharge tank 23, having a substantially tubular shape, is arranged in an attitude such that the longitudinal direction thereof is along the gravity direction. The radiator core 21 includes: tubes arranged in parallel with one another in the gravity direction and communicating the introduction tank 22 with the discharge tank 23; and radiation fins provided between the adjacent tubes. A fan (not illustrated) for blowing air toward the radiator core 21 is provided on the rear side of the radiator core 21. Heat is exchanged between the wind generated by the fan and the driving wind, and the cooling water flowing through the radiator core 21, which promotes heat radiation of the cooling water.

Next, the thermostat 30 will be described. The thermostat 30, provided at the junction of the flow paths R1 and R2, closes the flow path R1 when the temperature of the cooling water in the flow path R2 is lower than a threshold value, and opens the flow path R1 when the temperature of the cooling water in the flow path R2 is equal to or higher than the threshold value. Specifically, when the temperature of the cooling water introduced into the thermostat 30 from the flow path R2 in the closing state of the flow path R1 is equal to or higher than the threshold value, the thermostat 30 automatically opens the flow path R1 due to thermal expansion of a wax or a bimetal built in the thermostat 30. For example, since the temperature of the cooling water is lower than the threshold value at the time of starting the engine 10, the thermostat 30 closes the flow path R1, and the cooling water circulates through the flow path R2. This promotes the warm-up of the engine 10. When the temperature of the cooling water circulating through the flow path R2 is equal to or higher than the threshold value, the thermostat 30 opens the flow path R1, assuming that the warm-up of the engine 10 is completed. Accordingly, heat radiation of at least a part of the cooling water is promoted in the radiator 20 through the flow path R1, and the cooling of the engine 10 is promoted.

In the opening state of the thermostat 30, the cooling water flows into the thermostat 30 from both the flow paths R13 and R24 as illustrated in FIG. 1B. Therefore, the thermal expansion of the wax or the bimetal built in the thermostat 30 depends on the temperature of the cooling water flowing into the thermostat 30 from both the flow paths R13 and R24. That is, in the opening state of the thermostat 30, the opening and closing states of the flow path R1 depend on the temperature of the cooling water flowing into the thermostat 30 from both the flow paths R1 and R2.

The pouring portion 50 is provided at a position where the flow path R11, the flow path R12, and the flow path R3 are communicated with one another. A cap is attached to the pouring portion 50, and this cap is detached to pour the cooling water into the flow paths R1 to R3. The pouring portion 50 will be described later in detail. The heater 70 is a heat exchanger for heating, and heats the interior of a passenger compartment by using the high-temperature cooling water discharged from the engine 10 as a heat source.

Next, the flow path R3 will be described. The flow path R3 communicates a part between the flow paths R11 and R12 with the discharge tank 23 of the radiator 20 as described above. The flow path R3 is an example of a third flow path communicating a part, of the flow path R1 between the engine 10 and the radiator 20, with a part, of the flow path R1 between the radiator 20 and the thermostat 30. In the opening state of the thermostat 30, a part of the cooling water discharged from the engine 10 flows through either the flow paths R12 or the flow path R3 through the flow path R11. The cooling water flowing through the flow path R12 flows through the introduction tank 22, the radiator core 21, and the discharge tank 23 in this order so as to promote the heat radiation, and then is discharged to the flow path R13. The cooling water flowing through the flow path R3 bypasses the radiator core 21 and flows through the discharge tank 23, and then is discharged to the flow path R13. Thus, both the low-temperature cooling water flowing through the radiator core 21 and the high-temperature cooling water bypassing the radiator core 21 are mixed in the flow path R13 and flow therethrough. The role of the flow path R3 in the present embodiment will be described with reference to a following comparative example.

Figure 2:
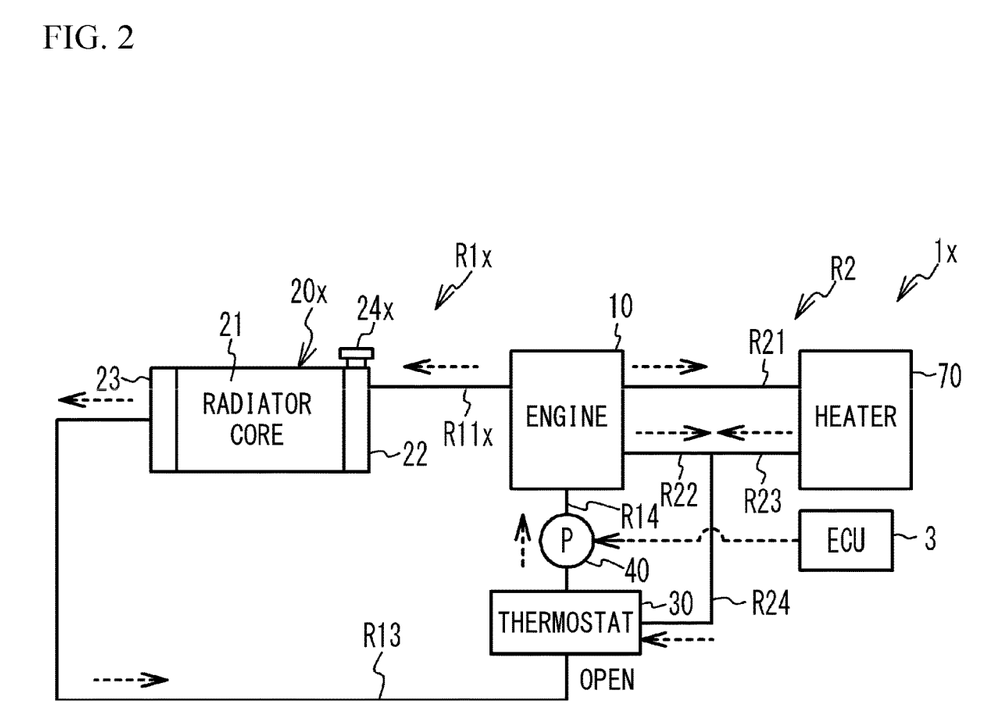
FIG. 2 is a schematic explanatory view of a cooling apparatus according to a comparative example.

FIG. 2 is a schematic explanatory view of a cooling apparatus 1x according to the comparative example. In the comparative example, the same reference numerals are given to the same configurations as in the present embodiment, and duplicate description is omitted. The flow path R3 and the pouring portion 50 are not provided in the cooling apparatus 1x, unlike the cooling apparatus 1 described above. Further, a flow path R11x of a flow path R1x communicates the engine 10 with the introduction tank 22 of a radiator 20x. Furthermore, a pouring portion 24x provided in the introduction tank 22 of the radiator 20x will be described later in detail.

In the opening state of the thermostat 30 in the comparative example as illustrated in FIG. 2, among the cooling water discharged from the engine 10, all the cooling water flowing through the flow path R11x flows into the thermostat 30 from the flow path R13 through the radiator core 21 of the radiator 20x. Additionally, as described above, the cooling water always flows into the thermostat 30 from the flow path R24 of the flow path R2. Herein, the cooling water flowing through the flow path R13 flows through the radiator core 21 of the radiator 20x and has a low temperature, whereas the cooling water flowing through the flow path R24 does not flow through the radiator 20x and has high temperature as described above.

Therefore, in the opening state of the thermostat 30, the low-temperature cooling water from the flow path R13 and the high-temperature cooling water from the flow path R24 simultaneously flow into the thermostat 30. Herein, if the temperature difference between the cooling water is large, the temperature of the cooling water in the thermostat 30 might be non-uniform, and the wax or the bimetal built in the thermostat 30 might repeat alternately the thermal expansion and the thermal contraction in a short period of time. Therefore, so-called hunting might occur in which the opening and closing of the thermostat 30 is alternately repeated in a short period of time. Such hunting might occur, for example, when relatively-low-speed rotation of the water pump 40 causes the low-temperature cooling water and the high-temperature cooling water not to sufficiently mix in the thermostat 30.

When the hunting of the thermostat 30 occurs, the state in which the cooling water flows through the radiator 20x and the state in which the cooling water does not flow therethrough are alternately repeated in a short period of time. Therefore, the temperature of the cooling water discharged from the engine 10 might fluctuate in a short period of time. This might influence devices controlled based on the temperature of the cooling water. For example, the rotational speed of the fan of the radiator 20x is controlled based on the temperature of the cooling water immediately discharged from the engine 10. Thus, if the temperature of the cooling water fluctuates in a short period of time due to the hunting of the thermostat 30, the rotational speed of the fan of the radiator 20x might also fluctuate in a short period of time. Moreover, opening and closing of an EGR valve for introducing a part of the exhaust gas into the intake system of the engine 10, and opening and closing of a purge valve for supplying the evaporated fuel generated in a fuel tank to the intake system are controlled based on the temperature of the cooling water. In such a way, if the hunting of the thermostat 30 occurs, operations of devices controlled based on the temperature of the cooling water might become unstable.

In contrast, in the cooling apparatus 1 according to the present embodiment, a part of the cooling water flowing through the flow path R11 flows to the flow path R3 and bypasses the radiator core 21 of the radiator 20 as illustrated in FIG. 1B.

Therefore, under a condition that the present embodiment and the comparative example are the same in the flow rate of the cooling water flowing into the thermostat 30 from the flow path R13, the temperature of the cooling water flowing into the thermostat 30 from the flow path R13 is higher in the present embodiment than in the comparative example. That is, the present disclosure reduces the temperature difference between the cooling water flowing from the flow path R13 into the thermostat 30 and the cooling water flowing from the flow path R24 thereinto. It is thus possible to suppress the temperature non-uniformity of the cooling water in the thermostat 30, and to suppress occurrence of the hunting of the thermostat 30. This also stabilizes operations of the devices controlled based on the temperature of the cooling water.

In addition, a flow path cross-sectional area of the flow path R3 is smaller than that of the flow path R12. In other words, the flow rate of the cooling water flowing through the flow path R3 is smaller than that of the cooling water flowing through the flow path R12. This suppresses a decrease in the heat radiation performance of the entire cooling water due to an increase in the flow rate of the cooling water flowing through the flow path R3 and bypassing the radiator core 21. This ensures the cooling performance of the engine 10 by the cooling water. In this manner, the cooling performance of the engine 10 is ensured while suppressing the hunting of the thermostat 30.

Figure 3:
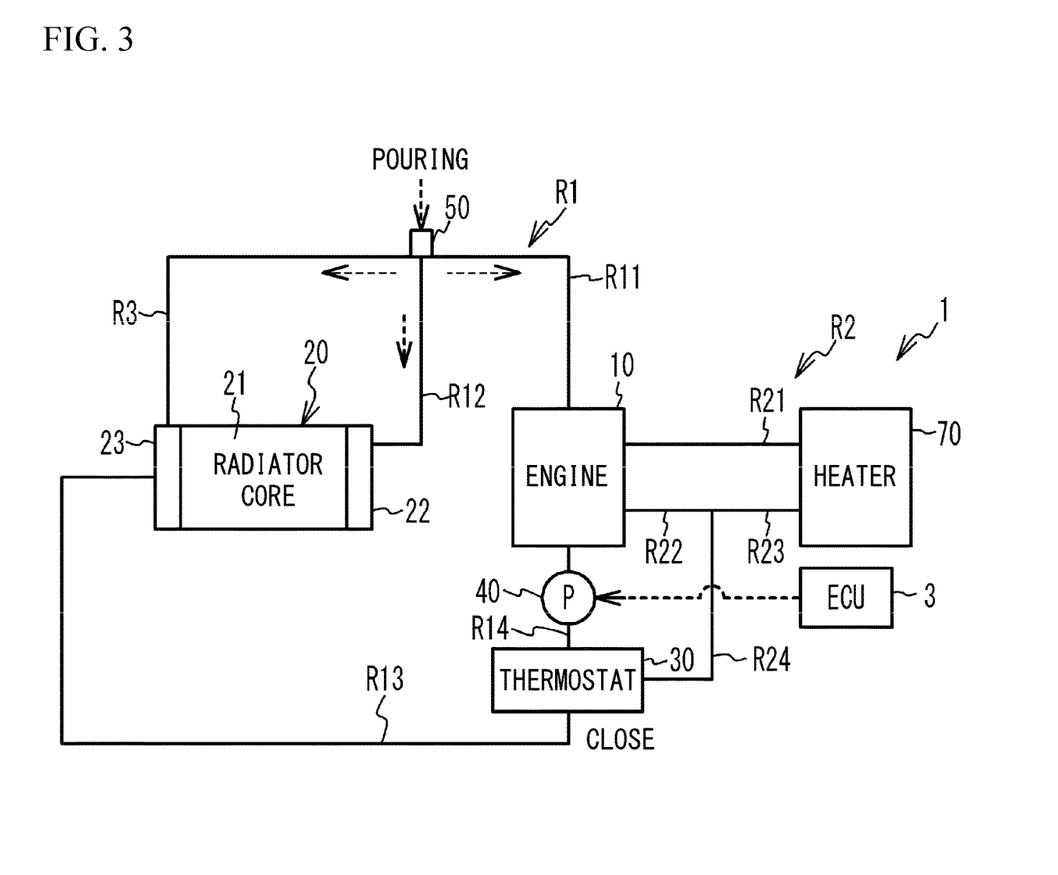
FIG. 3 is an explanatory view of injection of cooling water into the cooling apparatus according to the present embodiment.

Next, a description will be given of injection of the cooling water into the cooling apparatus 1. FIG. 3 is an explanatory view of injection of the cooling water into the cooling apparatus 1 according to the present embodiment. Additionally, when the cooling water is not supplied to the cooling apparatus 1, the thermostat 30 is in the closing state. The cooling water is injected into the cooling apparatus 1 from the pouring portion 50. Herein, the pouring portion 50 is arranged above the radiator 20, the engine 10, and the heater 70 in the gravity direction. Specifically, the junction of the flow paths R11, R12, and R3 in which the pouring portion 50 is provided is arranged above the radiator 20, the engine 10, and the heater 70 in the gravity direction. Therefore, the flow path R11 is provided so as to extend upward from the engine 10, and the flow paths R12 and R3 are also provided so as to extend upward from the introduction tank 22 and the discharge tank 23, respectively.

After the cooling water is injected into the pouring portion 50, the cooling water flows not only to the flow path R12 but also to the flow paths R11 and R3 by gravity. Accordingly, the cooling water is supplied to the introduction tank 22 and the discharge tank 23 of the radiator 20 through the flow paths R12 and R3, and is supplied to the engine 10 through the flow path R11 at the same time. It is therefore possible to supply the cooling water substantially simultaneously to both the radiator 20 and the engine 10. Also, the cooling water is supplied from the engine 10 to the heater 70.

Figure 4:
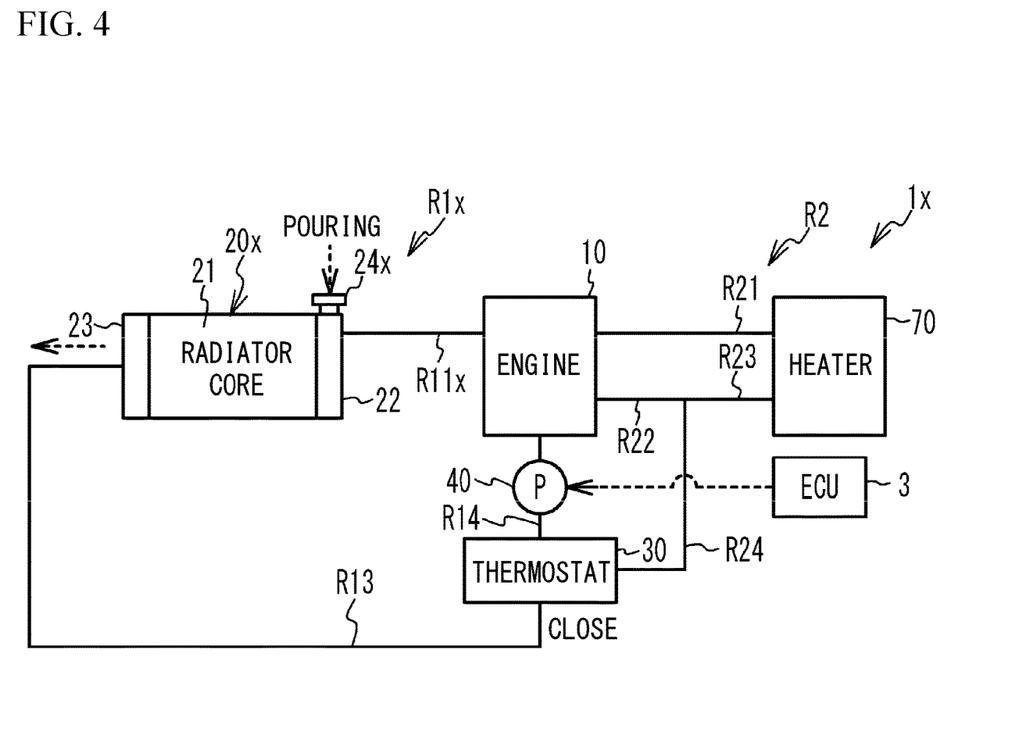
FIG. 4 is an explanatory view of injection of the cooling water into the cooling apparatus of the comparative example described above.

FIG. 4 is an explanatory view of injection of the cooling water into the cooling apparatus 1x of the comparative example described above. In the cooling apparatus 1x of the comparative example, a reserve tank (not illustrated) for storing the cooling water is a simple sealed type opened to the atmosphere. The simple sealed type can be manufactured at a low cost, as compared with a completely sealed type in which the reserve tank is shut off from the atmosphere and constitutes a part of the flow path of the cooling water. However, in the simple sealed type, the cooling water cannot be directly injected into the reserve tank, and the cooling water needs to be injected into the radiator 20x. Specifically, the cooling water needs to be injected into the pouring portion 24x provided above the introduction tank 22 of the radiator 20x in the gravity direction.

After the cooling water is injected into the pouring portion 24x in the comparative example, the cooling water is supplied to the radiator core 21 through the introduction tank 22. However, the flow path R11x is communicated with the relatively upper side of the introduction tank 22 in the gravity direction. Thus, the cooling water is not supplied to the engine 10 through the flow path R11x, unless the cooling water in the introduction tank 22 is supplied up to the height of the flow path R11x. Therefore, in the cooling apparatus 1x in the comparative example, the cooling water is supplied to the engine 10 after being sufficiently supplied to the radiator 20x. Accordingly, sufficient supply of the cooling water to both the radiator 20x and the engine 10 needs time. In particular, the cooling water needs to be supplied not only to the engine 10 but also to the heater 70, so the required amount of the cooling water is increased. Thus, if the amount of the cooling water is increased in this manner, the injection of the cooling water needs time to be completed.

Herein, it is conceivable to supply the cooling water to both the radiator 20x and the engine 10 through the introduction tank 22 at substantially the same time by changing the communication position of the flow path R11x and the introduction tank 22 of the radiator 20x to the lower side of the introduction tank 22 in the gravity direction. However, in this case, the changed communication position of the flow path R11x is positioned below the cylinder head of the engine 10 in the gravity direction, so that the cooling water might be hardly supplied from the introduction tank 22 to the cylinder head of the engine 10. Further, in this case, when the engine 10 drives and the thermostat 30 is in the opening state, the cooling water might flow to the lower side of the radiator core 21 but might not flow to the upper side thereof, which might degrade the heat radiation of the cooling water.

On the other hand, in the present embodiment, the pouring portion 50 is arranged above the radiator 20 and the engine 10 in the gravity direction as described above, so the cooling water is supplied substantially simultaneously to the radiator 20 and the engine 10, which shortens the period to complete the water injection. Further, since the flow path R12 is communicated with the relatively upper side of the introduction tank 22 in the gravity direction, when the engine 10 drives and the thermostat 30 is in the opening state, the cooling water flows through the entire radiator core 21. This ensures the heat radiation of the cooling water.

In addition, in the present embodiment, the cooling water is supplied substantially simultaneously to both the introduction tank 22 and the discharge tank 23 through the flow path R12 and the flow path R3, respectively. It is thus possible to supply the cooling water into the radiator core 21 in a short period of time.

Figure 5:
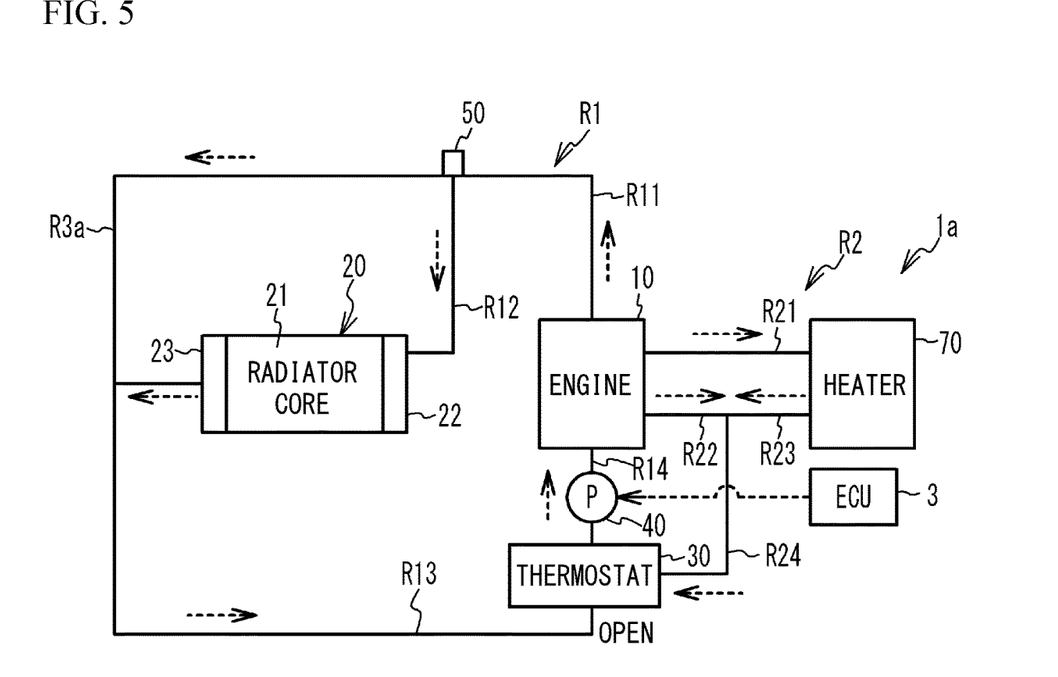
FIG. 5 is a schematic explanatory view of a cooling apparatus according to a variation.

Next, a variation will be described. FIG. 5 is a schematic explanatory view of a cooling apparatus according to a variation. In the variation, the same reference numerals are given to the same configurations as those of the above-described embodiment, and redundant explanation is omitted. In a cooling apparatus 1a, a flow path R3a is provided instead of the flow path R3. The flow path R3a communicates the discharge tank 23 of the flow path R13 with the thermostat 30. Also in this state, in the opening state of the thermostat 30, a part of the cooling water discharged from the engine 10 and flowing through the flow path R11 flows through the flow path R3a and bypasses the radiator 20. This suppresses the occurrence of the hunting of the thermostat 30, like the above-described embodiment.

At the time of injecting the cooling water, unlike the above-described embodiment, it is difficult to supply the cooling water from the discharge tank 23 to the radiator core 21. However, it is possible to supply the cooling water from the flow path R12 to the introduction tank 22 and from flow path R11 to the engine 10. Therefore, also in this variation, the cooling water injection operation can be completed in a short period of time, as compared with the comparative example.

In the above embodiment and variation, the heater 70 is arranged on the flow path R2. However, in addition to the heater 70, an exhaust heat recovery device for heat-exchanging between the cooling water and the exhaust gas may be provided on the flow path R2 in the vicinity of the exhaust passage of the engine 10. Such an exhaust heat recovery device early warms up the engine 10 at the time of cold start. In this case, for example, it is conceivable to provide the exhaust heat recovery device in parallel to the heater 70. Such a cooling apparatus equipped with the exhaust heat recovery device needs the large amount of the cooling water. Thus, a configuration capable of completing the water injection operation in a short period of time like the present embodiment is suitable for such a cooling apparatus. Further, a heat exchanger other than the heater 70 and the exhaust recovery device may be provided on the flow path R2.

Also, in the present embodiment and the variation, the radiator 20x illustrated in the comparative example may be adopted. That is, the radiator 20x in which the pouring portion 24x is provided in the introduction tank 22 may be adopted instead of the above-described radiator 20. Even in this case, since the cooling water can be injected from the pouring portion 50, there is no need to use the pouring portion 24x. This makes it possible to suppress the occurrence of the hunting of the thermostat 30 while adopting the simple-sealing-type radiator 20x which is low in cost.

Although some embodiments of the present disclosure have been described in detail, the present disclosure is not limited to the specific embodiments but may be varied or changed within the scope of the present disclosure as claimed.

What is claimed is:

1. A cooling apparatus of an engine, comprising:
a radiator promoting heat radiation of cooling water of the engine;
a first flow path circulating the cooling water discharged from the engine through the radiator to the engine;
a second flow path circulating the cooling water discharged from the engine to the engine without the cooling water flowing through the radiator;
a thermostat attached in a junction of the first and second flow paths, closing the first flow path when a temperature of the cooling water in the second flow path is lower than a threshold value, and opening the first flow path when the temperature of the cooling water in the second flow path is equal to or higher than the threshold value; and
a third flow path communicating a part of the first flow path between the engine and the radiator, with a part of the first flow path between the radiator and the thermostat, wherein
a flow path cross-sectional area of the third flow path is smaller than a flow path cross-sectional area of the first flow path, and
an upstream end of the third flow path is connected to the first flow path between the engine and the radiator, and a downstream end of the third flow path is connected to the first flow path between the radiator and the thermostat.

2. The cooling apparatus of the engine of claim 1, wherein
the radiator includes an introduction tank, a discharge tank, and a radiator core positioned between the introduction tank and the discharge tank and communicating the introduction tank with the discharge tank,
the first flow path is communicated with the introduction tank, and
the third flow path is communicated with the part of the first flow path positioned between the radiator and the thermostat through the discharge tank.

3. The cooling apparatus of the engine of claim 1, further comprising:
a pouring portion provided between the engine and the radiator and in a portion where the first and third flow paths communicate with each other, and capable of supplying the cooling water to the first and third flow paths,
wherein the pouring portion is arranged above the engine and the radiator in a gravity direction.

* * * * *